Jan. 5, 1926.

L. WERTHEIMER

FAUCET

Filed April 27, 1925

1,568,647

Leo Wertheimer INVENTOR

ATTORNEY

Patented Jan. 5, 1926.

1,568,647

UNITED STATES PATENT OFFICE.

LEO WERTHEIMER, OF BUFFALO, NEW YORK.

FAUCET.

Application filed April 27, 1925. Serial No. 26,039.

*To all whom it may concern:*

Be it known that I, LEO WERTHEIMER, a citizen of the United States of America, and a resident of the city of Buffalo, county of Erie, and State of New York, have invented certain new and useful Improvements in Faucets, of which the following is a full, clear, and exact description.

My invention relates in general to faucets or valves, and in particular to a valve which is primarily designed for dispensing potable liquids, such as coffee.

One of the objects of my invention has been to provide a faucet of this nature which effectively seals itself when shut off, thereby preventing dripping of the liquid being handled.

Another object has been to provide a faucet which shall be durable and remain liquid-tight under conditions of wear.

Furthermore, my invention is of such a nature that it may be thoroughly and easily cleaned which is very essential in valves or faucets where potable liquids are being dispensed.

The above objects and advantages have been accomplished by the device shown in the accompanying drawings, of which:

Figure 1:
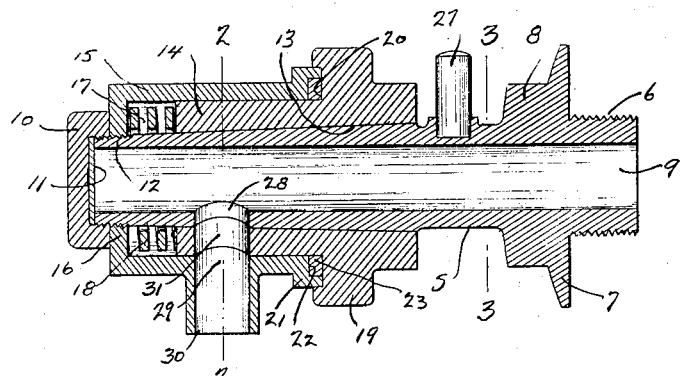
Fig. 1 is a side, sectional view of my complete device.
Figure 2:
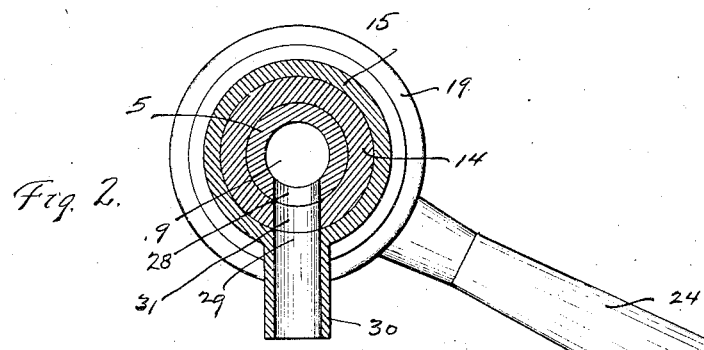
Fig. 2 is a sectional view taken on line 2—2 of Fig. 1.

The device comprises a dispensing tube 5 which is provided with screw threads 6 at its inner end for attachment to a coffee urn or other receptacle containing the liquid being dispensed. A flange portion 7 and a hexagonal portion 8 are provided for properly securing the tube in place. The tube is provided with a central opening 9 which extends clear through the tube, thus making it very easy to clean the interior of the same. The outer end of the tube is closed by a cap 10, having a washer 11. The cap 10 is screw-threaded to the outer end 12 of the tube.

The outer periphery of the tube is provided with a tapered surface 13. Rotatably disposed upon the dispensing tube 5 is an operating sleeve 14, which is provided with a central bore of a diameter and taper to fit the tapered surface 13 of the dispensing tube. The outer diameter of the operating tube is finished and an outer stationary sleeve 15 is arranged in bearing contact therewith. This sleeve is provided with an inwardly extending flange 16 which is screw-threaded over the threaded portion 12 of the dispensing tube, and preferably locked in position by means of the cap 10. The sleeve 15 is longer than the finished part of the operating sleeve 14, whereby a recess 17 is provided. Mounted within this recess is a helical spring 18, one end of which bears against the flange 16 of the sleeve 15 and the other end of which bears against the end of the operating sleeve 14. This spring serves to keep the operating sleeve forced towards the larger diameter of the tapered surface 13, whereby the joint between the dispensing tube 5 and the operating sleeve 14 will be kept tight and compensation for wear thus provided. The operating sleeve is provided with a flange 19 which is formed in the face adjacent the stationary sleeve 15 with a recess 20. The stationary sleeve 15 is also provided with a flange 21 in which is formed a recess 22. A resilient washer 23 is preferably placed in the recess 22 of the stationary sleeve 15. The resilient washer 23, together with the face of the flange 21, is disposed within the recess 20 of the flange 19, whereby the joint between the stationary sleeve 15 and the operating sleeve 14 is effectively sealed. An operating handle 24 is secured to the flange 19 of the operating sleeve, whereby the sleeve may be rotated. A stop pin 25 is carried by the flange 19 of the operating sleeve, which engages with detent pins 26 and 27, to limit its movement.

Figure 3:
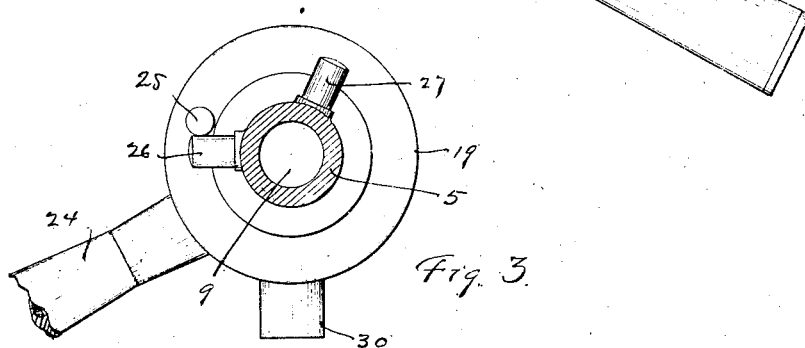
Fig. 3 is a similar sectional view taken on line 3—3 of Fig. 1.

The dispensing tube is provided, near its outer end, with a lateral aperture 28, and the stationary sleeve 15 is likewise provided with an aperture 29 and a downwardly extending nozzle 30. The stationary sleeve is so adjusted that its aperture 29 and tube 30 are in registering position with the aperture 28 of the dispensing tube. An aperture 31 is also formed in the operating sleeve 14 which is so located as to be in register with the openings 28 and 29 when the stop pin 25 is in contact with the detent 26, as shown in Fig. 3.

It will be obvious that when the parts are in the position shown in the drawings, and the apertures 28, 29, and 31 are in registering positions, that liquid supplied to the dispensing tube will flow from the nozzle 30, carried by the stationary sleeve 15. When the operating sleeve 14 is moved by means of the handle 24, so as to bring the stop pin 25 into contact with the detent 27, the aperture 31 of the operating sleeve will be moved out of registering position with the apertures 28 and 29 and thereby cut off the supply of liquid. Owing to the joints between the dispensing tube and the operating sleeve, and between the operating sleeve and the stationary sleeve, together with packing washers 11 and 23, leakage of the liquid being dispensed is effectively prevented.

Obviously, some modifications of the details herein shown and described may be made without departong from the spirit of my invention, or the scope of the appended claims, and I do not, therefore, wish to be limited to the exact embodiment herein shown and described, the form shown being merely a preferred embodiment thereof.

Having thus described my invention, what I claim is:

1. A faucet comprising a dispensing tube formed with an external, tapered periphery, a stationary sleeve carried by the dispensing tube an operating sleeve rotatably mounted upon the dispensing tube and having a portion of its periphery in bearing contact with the interior surface of the stationary sleeve, the operating sleeve having an exposed flange portion, packing means between the flange portion of the operating sleeve and the stationary sleeve, and means for rotating the operating sleeve.

2. A faucet comprising a dispensing tube being formed with a centrally arranged aperture extending entirely through the tube, a cap for closing one end of the tube, a stationary sleeve carried by the dispensing tube, and an operating sleeve disposed between and in bearing contact with the dispensing tube and the stationary sleeve.

3. A faucet comprising a dispensing tube provided with a tapered exterior periphery, and being formed with a centrally arranged aperture extending entirely through the tube, a cap for closing the outer end of the tube, a stationary sleeve carried by the tube, having its body part in spaced relation with the dispensing tube, an operating sleeve carried by the dispensing tube and disposed between this tube and the stationary sleeve, and a spring disposed in the space between the dispensing tube and stationary sleeve, and bearing against the end of the operating sleeve, whereby the operating sleeve will be held firmly upon its tapered bearing seat.

4. A faucet comprising a dispensing tube, a stationary sleeve carried by and in spaced relation with the dispensing tube, registering apertures formed in the dispensing tube and stationary sleeve, an operating sleeve carried in the space between and in bearing contact with the dispensing tube and stationary sleeve, and, the operating sleeve being formed with an aperture, registerable with the apertures of the dispensing tube and stationary sleeve upon rotation of the operating sleeve.

In testimony whereof, I have hereunto signed my name.

LEO WERTHEIMER.